United States Patent Office 3,450,277
Patented June 17, 1969

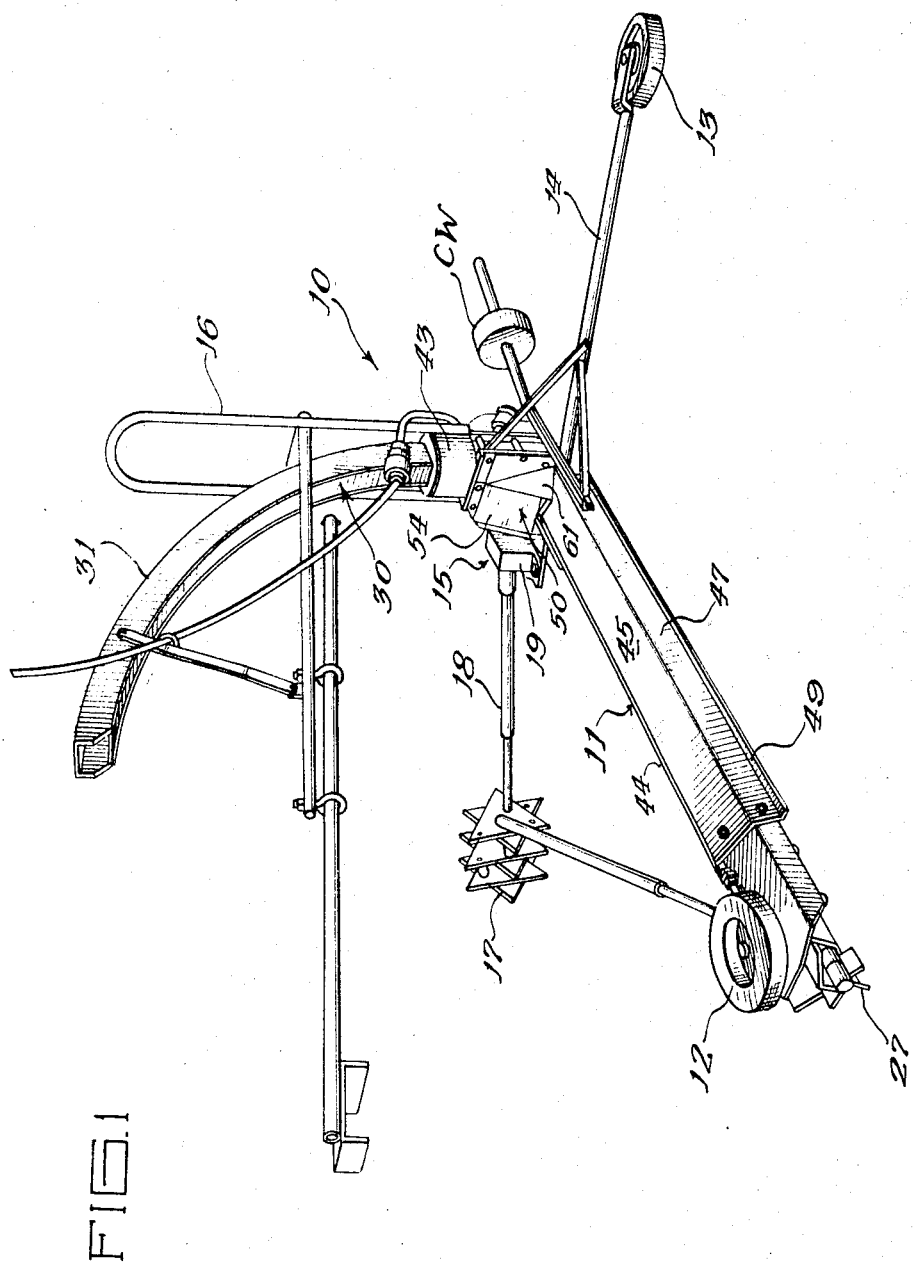

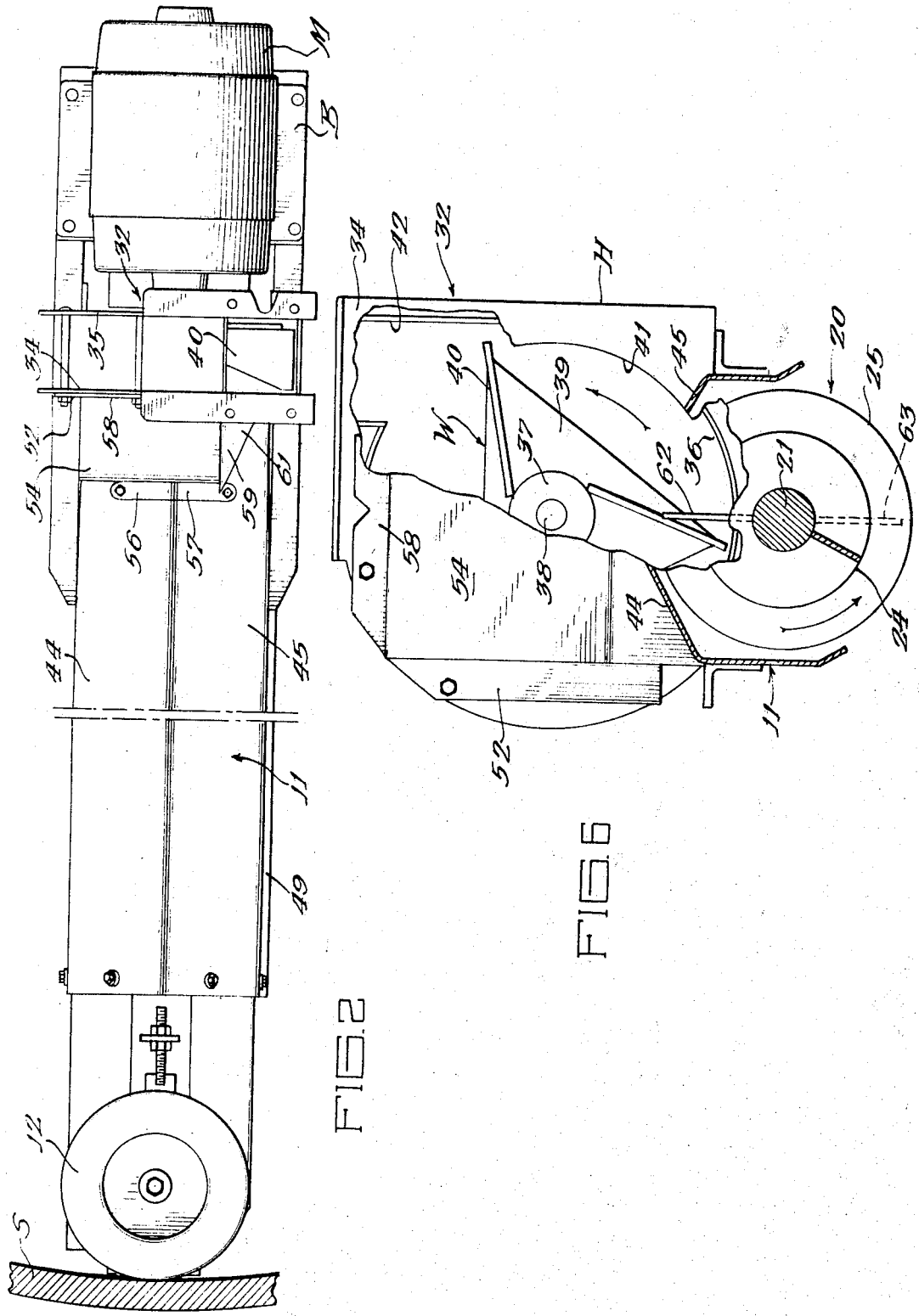

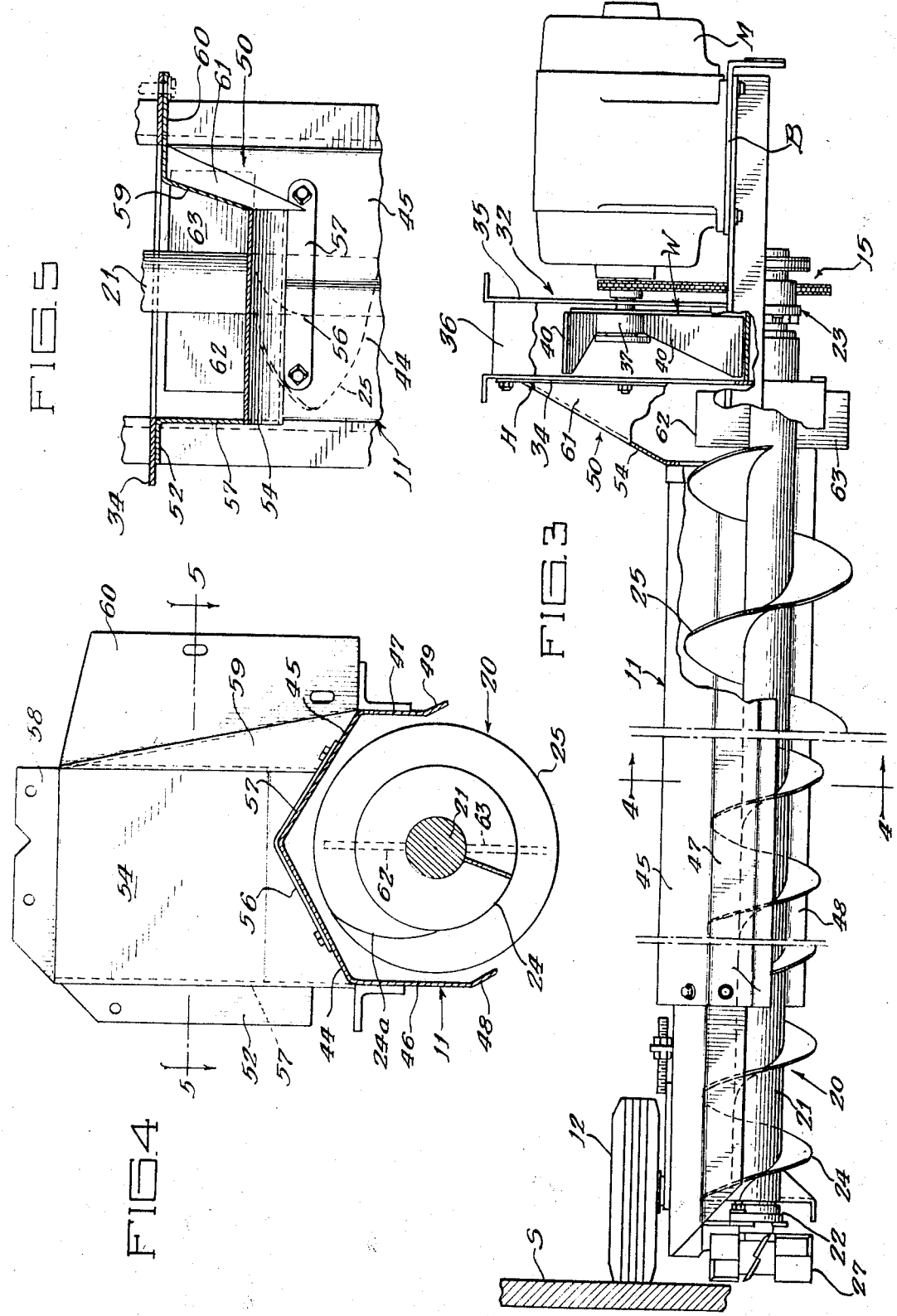

3,450,277
SILO UNLOADER
Loren P. Boppart, Harvard, Ill., assignor to Starline, Inc., a corporation of Delaware
Filed Jan. 17, 1967, Ser. No. 609,901
Int. Cl. B65g 65/40; A01f 25/16
U.S. Cl. 214—17                              9 Claims

ABSTRACT OF THE DISCLOSURE

An unloader for removing material from the top of a supply of material within a silo, wherein a sweep arm having a material gathering and conveying auger thereon is rotatable about the axis of the silo. The auger includes a portion of enlarged diameter and pitch which communicates with an impeller housing, and inclined deflector plates direct material toward the center of the impeller wheel.

Background of the invention

This invention relates in general to silo unloaders, and more particularly to unloaders for collecting and removing material from the top of a supply of material within a silo.

Top silo unloaders are well known in the prior art, and usually consist of a material collecting and conveying device that is movable vertically within a silo to follow the upper surface of the material within the silo downwardly as material is removed. In one form of top silo unloader, the material collecting and conveying means takes the form of an auger conveyor that is rotatably mounted upon a sweep arm that extends generally radially of the silo. Means is provided for rotating the sweep arm about the axis of the silo, so that the uppermost material within the silo is conveyed radially inwardly toward the center of the silo, where it is removed therefrom by discharging means extending outwardly of the silo. This arrangement also includes cable means, or the like, for gradually vertically lowering the rotatable sweep arm in the silo as the material is removed, and the cable means is usually controlled by motorized or manually operated winch means. In an exemplary form of top silo unloader the discharging means has taken the form of an impeller wheel rotatable within a confining impeller housing, and having vane means thereon for deflecting material gathered by the auger conveyor to a discharge chute that directs the material outwardly of the silo. In order that the impeller type of discharging means will be effective in removing material from the silo, it is necessary that the impeller wheel be rotated at a relatively high speed to give the material sufficient impetus to travel along the discharge chute and outwardly of the silo. Because of the high rotational speed of the impeller wheel, difficulty has been encountered in the past in transferring material from the auger conveyor to the impeller structure, since the material being fed by the auger conveyor is travelling at a much slower rate than the impeller wheel. Additionally, the fast rotating impeller wheel is capable of handling a larger quantity of material than has been fed to it in the past by the relatively slower rotating auger conveyor, and this has led to a relatively high power consumption in proportion to the amount of material discharged from the silo.

The problems mentioned above have been recognized by the prior art, and one solution that has been proposed, as for example in Poutsch Patent No. 3,227,293, is to provide a stub auger on the shaft of the impeller wheel to assist the gathering auger in conveying material into the impeller casing. This arrangement has also included a shroud surrounding the stub auger, and kicker blades on the gathering auger for throwing material toward the stub auger. This structure has not been entirely satisfactory, in that the stub auger is a relatively expensive item which significantly increases the over-all cost of the unit; and more imoprtantly, in that the stub auger is difficult to support on the unloader structure. In this respect it should be noted that it has been thought to be desirable to have the shroud surrounding the stub auger removably mounted on the unloader frame, and this has precluded the use of a stub auger support means on the shroud, so that usually the stub auger is merely supported in cantilever fashion at the outer end of the impeller wheel shaft. It will be readily appreciated that the relatively large weight at the outer end of the impeller wheel places a severe load on the bearings for the impeller wheel shaft, and may lead to a mechanical breakdown after only a short period of use.

The arrangement disclosed in the above mentioned Poutsch patent has the further drawback that it will not, in fact, satisfactorily increase the rate at which feed is accepted by the impeller wheel. There are many interrelated factors which are thought to contribute to this deficiency. Firstly, the axis of the impeller wheel is spaced vertically above the axis of the gathering auger by an amount such that the relatively small diameter gathering auger does not give the material being conveyed radially inwardly thereby sufficient vertical velocity to be readily accepted by the stub auger. Also, since the impeller wheel and stub auger are rotated at a higher rate of speed than the gathering auger, the stub auger tends to deflect and reject the material moving vertically upwardly relatively slowly toward it. Secondly, the shroud surrounding the stub auger is positioned generally perpendicularly with respect to the plane of movement of the impeller wheel, so that the material deflected by the shroud is given no component of movement inwardly toward the impeller wheel. Thirdly, the relatively narrow kicker blades, which extend approximately only 12½% of the length of the opening in the bottom of the shroud, do not engage enough of the material to effectively convert the axial component of movement of the material into pure radial movement upwardly toward the stub auger.

Summary of the invention

Accordingly, the general purpose of the present invention is to improve the efficiency of operation of a top silo unloader of the type described above by providing a novel arrangement for rapidly introducing material into the impeller wheel at the point of its least speed, thereby obviating the necessity of a stub auger on the impeller wheel shaft. The invention comprehends a novel top silo unloader combination wherein a relatively large diameter and pitch auger section at the inner end of the gathering auger cooperates with at least one relatively wide kicker element to accelerate material upwardly into deflecting means having inclined deflecting surfaces which direct the material toward the center of the impeller wheel.

An object of the invention is to provide an improved auger construction in a top unloading silo unloader for accelerating material conveyed by the auger at the discharge end of the auger.

Another object of the invention is to provide a top unloading silo unloader having an impeller type of discharging means with an improved arrangement for deflecting material gathered by a material collecting and conveying means into the center of the impeller wheel.

A further object of the invention is to provide a silo unloader as set forth in the preceding paragraph with at least one relatively axially elongated kicker element for directing material upwardly toward the deflecting means. A related object is to provide a kicker element which extends across at least a major portion of the length of the opening in the bottom of the deflector means, and preferably which extends across approximately 70% of the opening.

These and other objects of the invention will hereinafter become more fully apparent from the following description taken in connection with the annexed drawings.

*Brief description of the drawings*

FIG. 1 is a perspective view of a silo unloader having the improvements of the present invention incorporated therein;

FIG. 2 is a top plan view of the top silo unloader illustrated in FIG. 1, with certain elements removed;

FIG. 3 is a side elevational view of the structure shown in FIG. 2, with certain portions broken away for clarity of illustration;

FIG. 4 is a sectional view taken generally along line 4—4 of FIG. 3;

FIG. 5 is a sectional view taken generally along line 5—5 of FIG. 4; and

FIG. 6 is a sectional view similar to FIG. 4 with certain parts being broken away for clarity of illustration.

*Description of the preferred embodiment*

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated. The scope of the invention will be pointed out in the appended claims.

Referring to the drawings in greater detail, the silo unloader is illustrated in its entirety at 10, and the unloader is of the top unloading type; that is, it gathers and removes material from the top of a supply of material within the silo, rather than from the bottom of a supply of material within the silo. Unloader 10 is preferably suspended within a silo by cable means (not shown) connected to an inverted U-shaped suspension arch 16; and the cable means is trained over a cable winding winch (not shown, and which can either be motorized or manually operable). As is well known in the art, the silo unloader 10 is gradually lowered in the silo as the material is removed therefrom.

Unloader 10 includes a sweep arm 11 that is adapted to extend radially of a generally cylindrical silo. A first guide wheel 12 is provided at the outer end of sweep arm 11, and a second guide wheel 13 is carried by an arm 14 that extends laterally outwardly from sweep arm 11; and wheels 12 and 13 are adapted to bear against the inner surface of a silo wall S (FIGS. 2 and 3) to guide the sweep arm as it is rotated about the silo. Unloader 10 is provided with a counterweight CW on the side thereof opposite sweep arm 1 to balance the unloader during rotation of the sweep arm.

Power means 15 is provided at the inner end of sweep arm 11, and includes a motor M carried by a bracket B mounted on the innermost portion of the sweep arm. A propelling wheel 17, which is adapted to drivingly engage the upper surface of the material within the silo, is carried at the outer end of an extensible drive tube 18; and drive tube 18 is connected to motor M through a speed reducer 19 (FIG. 1) and suitable drive means, partially visible in FIG. 3.

A material gathering and conveying means is provided on sweep arm 11 for gathering material and conveying the same radially inwardly of the silo as the sweep arm 11 rotates thereabout, and herein said means takes the form of an auger conveyor 20 mounted for rotation with respect to sweep arm 11. Auger conveyor 20 includes an elongate shaft 21 that is supported at its outer end by a bearing 22 suspended from sweep arm 11, and which is supported adjacent its inner end by a bearing 23 also suspended from the sweep arm 11; and shaft 21 is rotated in a counterclockwise direction, as viewed in FIGS. 4 and 6, by chain and sprocket means connected with the output shaft of motor M. Auger conveyor 20 further includes helicoid flighting secured to the shaft 21, as by welding or the like; and as can be seen in FIGS. 3, 4 and 6, the auger conveyor includes a first section 24 of helicoid flighting of the one diameter and pitch at the outer end of the sweep arm 11, and a second section 25 of a larger diameter and pitch at the inner end of the sweep arm 11. Flighting section 25 serves to accelerate material into material discharging means 30 at the inner end of the sweep arm 11, and also functions to provide a circular well in the material at the center of the silo thereby creating a clearance for the drive elements carried at the inner end of the auger shaft 21. In a preferred embodiment of the invention, flighting section 24 is 6″ in diameter and flighting section 25 is 9″ in diameter; and it has been found that this 50% step-up in auger diameter, when accompanied by an increase in pitch from 6″ to 9″, is sufficient to increase the speed of the material being conveyed, particularly at the outer periphery of the flighting, to a degree that it will approach the speed of the impeller wheel (to be hereafter described) of the discharging means 30. It has been found that a relatively short length of large diameter and pitch auger flighting is adequate to sufficiently accelerate the material, and in the preferred embodiment highly satisfactory results have been achieved with the 6″ diameter section 24 being approximately 50″ in length and the 9″ diameter section 25 being slightly less than 18″ in length. Flighting sections 24 and 25 are preferably secured to one another, as by welding, and the junction therebetween is tapered at 24a (FIG. 4) to provide a smooth transition between the two flighting sections. Cutters (not shown) such as knives or the like may be secured to the auger flighting for loosening material as the sweep arm rotates about the silo, and a cutter assembly 27 is preferably provided adjacent the outer end of the auger shaft 21 for cutting through the relatively dense material adjacent the silo wall S.

The material discharging means 30 includes an elongate chute 31 which extends upwardly from a collector ring 43 at the inner end of the sweep arm 11 and projects toward an opening in the silo wall S. Impeller means 32 at the inner end of sweep arm 11 directs material collected by the auger 20 into the chute 31 for discharge from the silo. Impeller means 32 includes an impeller housing H rotatably supported on collector ring 43 and defined by a pair of spaced, generally parallel front and rear housing plates 34 and 35, respectively, and a generally cylindrical connector plate 36 extending therebetween. As seen in FIG. 6, plate 36 includes a vertically extending outlet throat 42 which communicates with chute 31 through an opening in the collector ring 43. An impeller wheel W is rotatably mounted within housing H, and is driven by motor M. Wheel W includes a hub 37 mounted on the output shaft 38 of motor M, and a vertically disposed generally triangular web or plate 39 is secured to hub 37, with a plurality of impeller vanes 40 being fixed thereto. Vanes 40 are arranged generally tangentially with respect to hub 37, and the outer ends of blades 40 pass closely adjacent to the cylindrical portion of connecting plate 36. As seen in FIG. 3, vanes 40 widen outwardly from the hub, and the rear edges of the vanes are positioned close to rear housing plate 35, while the outermost front tips of the vanes are close to front housing plate 34. Material is fed by the auger conveyor 20 through a generally circular material inlet opening 41 in the front plate 34 of housing H (FIG. 6) and the blades 40 project the material out of the silo through the housing outlet throat 42 and chute 31.

As best seen in FIGS. 1 and 4, the sweep arm 11 includes a housing covering the auger conveyor 20, and the housing includes inclined central portions 44 and 45, and side portions 46 and 47 extending vertically downwardly from the outer edges of portions 44 and 45, respectively, with inclined flanges 48 and 49 at the lower ends of sides 46 and 47. Side 47 is somewhat shorter than side 46, so that as the sweep arm rotates to the right as viewed in FIG. 4, the auger conveyor 20 can move freely into the material within the silo.

Material deflecting means 50 is provided at the inner end of the sweep arm 11 for deflecting material collected by the auger conveyor 20 into the impeller housing H. As best seen in FIGS. 4 and 5, deflecting means 50 includes an upright side wall 51 having a mounting flange 52 bolted to the front plate 34 of impeller housing H, and a front wall 54 which is inclined upwardly and inwardly toward the impeller housing H in confronting relationship with opening 41. The front wall 54 has lower mounting flange means 56 and 57 secured to the conveyor cover portions 44 and 45, respectively, and an upper attaching flange 58 secured to the front plate 34 of the impeller housing H. Opposite the side wall 51 is a side wall 59 having a mounting flange 60 secured in facing relationship to impeller housing front plate 34, and wall 59 is generally triangular so as to close the space between the front plate 34, the front wall 54, and the inclined conveyor cover portion 45. As is clear from FIG. 5, wtih the auger conveyor 20 rotating in a counterclockwise direction, as viewed in FIG. 4, the inner surfaces of walls 54 and 59 cooperate to define means for deflecting material inwardly toward the center of the impeller wheel W.

Means is provided at the inner end of auger conveyor 20 in vertical alignment with the deflecting means 50 for converting the axial and radial movement of material by the auger flighting into pure vertical movement. In the illustrated embodiment, said means takes the form of a pair of thin, flat kicker blades 62 and 63 that extend radially outwardly from diametrically opposite portions of auger shaft 21. As is clear from FIG. 3, blades 62 and 63 extend along a substantial distance of shaft 21, and in fact extend across a major portion of the opening in the bottom of the enclosure formed by the deflector means 50. In an exemplary embodiment of the invention, blades 62 and 63 extend across approximately 70% of the opening in the bottom of the enclosure formed by the deflector means 50.

In operation, the material that is gathered and conveyed by auger flighting section 24 is accelerated by the large diameter-large pitch auger flighting section 25, and the rapidly moving material is then engaged by the kicker blades 62 and 63, which throw the material upwardly into the deflector means 50. The upwardly traveling material engages the inner deflector walls 54 and 59 which direct the material into the impeller housing H through the opening 41 in housing member 35. Front wall 54 is preferably disposed at an angle of approximately 60° with respect to the horizontal, so that the material being thrown thereagainst by the kicker blades 62 and 63 will be directed toward the portion of the impeller wheel W having the least linear speed and minimum resistance to entry of material, and more particularly toward the center of the impeller wheel. Portion 61 of member 59 is preferably disposed at an angle of approximately 70° with respect to the plane of the housing front plate 34, and cooperates with member 54 to also direct the material being thrown upwardly by kicker blades 62 and 63 toward the center of the impeller wheel W. The rapidly moving, positively guided material, which is accelerated by flighting section 25 and directed by kicker blades 62 and 63 into deflector means 50, is readily accepted by the impeller wheel W, so that the latter can be rotated at a relatively high speed, thereby increasing the material output of the unloader in a given time period and decreasing the power requirements for unloading a desired quantity of material. Thus, it will be appreciated that each of the objects of the invention have been fully achieved.

I claim:

1. In a silo unloader of the type which has a sweep arm adapted to rest on top of material within a silo, means for rotating the sweep arm about the axis of said silo, means at the inner end of said sweep arm for discharging material outwardly of said silo including an impeller housing and an impeller wheel rotatable therewtihin on a first substantially horizontal axis, and driven auger means having a shaft carried by said sweep arm on a second axis which is below and parallel to said first axis and helicoid flighting on said shaft for conveying material inwardly of said silo into said discharging means, the improvement comprising: said flighting including a first portion at the outer end of said shaft of one diameter and pitch and a second portion adjacent the inner end of said shaft of a larger diameter and larger pitch, said second flighting portion being positioned adjacent said impeller housing and forming means for increasing the radial and axial velocity of material conveyed by said first flighting portion, at least one generally radially extending flipper member mounted on the shaft radially inwardly from said second flighting portion for positively driving material received from the second flighting portion upwardly, and deflector means to direct said upwardly driven material toward the center of the impeller wheel.

2. The silo unloader of claim 1 in which the deflector means includes a front deflector wall having a material deflecting surface facing the impeller wheel and disposed at an angle of less than 45° with respect to the plane of the impeller wheel.

3. The silo unloader of claim 1 in which the deflector means includes a side deflector wall having a material deflecting surface positioned generally to one side of the impeller wheel and disposed at an angle of greater than 45° with respect to the plane of said impeller wheel.

4. The silo unloader of claim 1 wherein said deflector means includes a first deflector member having a material deflecting surface facing said impeller wheel and disposed at an angle of less than 45° with respect to the plane of said impeller wheel and a second deflector member having a material deflecting surface positioned generally to one side of said impeller wheel and disposed at an angle of greater than 45° with respect to the plane of said impeller wheel, the junction between the material deflecting surfaces of said first and second members forming an obtuse angle.

5. A silo unloader as set forth in claim 1 wherein said deflector means includes an enclosure having at least two sides inclined toward said impeller wheel.

6. A silo unloader as set forth in claim 1 wherein said flipper member extends acorss a major portion of the bottom of said enclosure.

7. A silo unloader as set forth in claim 6 wherein said flipper member extends across about 70% of the bottom of said enclosure.

8. A silo unloader as set forth in claim 1 wherein said first flighting portion is longer than said second flighting portion.

9. A silo unloader as set forth in claim 8 wherein said second flighting portion is approximately 50% larger in diameter than said first flighting portion.

References Cited

UNITED STATES PATENTS

| 3,005,551 | 10/1961 | Kesinger | 198—214 X |
| 3,227,293 | 1/1966 | Poutsch | 214—17 |
| 3,272,355 | 9/1966 | Loesch et al. | 214—17 |

ROBERT G. SHERIDAN, *Primary Examiner.*

U.S. Cl. X.R.

214—83.28; 302—59